United States Patent [19]
Patterson, Jr.

[11] Patent Number: 6,098,184
[45] Date of Patent: Aug. 1, 2000

[54] METHOD FOR IMPROVING MOUSE PERFORMANCE AND VIRTUAL DEVICE DRIVER THEREFOR

[75] Inventor: John L. Patterson, Jr., Fort Worth, Tex.

[73] Assignee: Spotware Technologies, Inc., San Diego, Calif.

[21] Appl. No.: 09/074,947

[22] Filed: May 8, 1998

[51] Int. Cl.[7] .................................................. H02L 1/00
[52] U.S. Cl. ................................ 714/44; 714/40; 714/44; 714/47; 714/48; 714/49; 710/19; 710/64; 710/73
[58] Field of Search ......................... 714/40, 44, 47, 714/48, 49; 710/19, 73, 64

[56] References Cited

U.S. PATENT DOCUMENTS

| | | | |
|---|---|---|---|
| 4,386,346 | 5/1983 | Levine | 340/709 |
| 5,164,713 | 11/1992 | Bain | 340/710 |
| 5,264,836 | 11/1993 | Rubin | 345/157 |
| 5,287,120 | 2/1994 | Okada et al. | 345/163 |
| 5,565,887 | 10/1996 | McCambridge et al. | 345/145 |
| 5,570,111 | 10/1996 | Barrett et al. | 345/157 |
| 5,574,858 | 11/1996 | Witte | 714/56 |
| 5,675,129 | 10/1997 | Burns et al. | 178/18 |
| 5,699,082 | 12/1997 | Marks et al. | 345/157 |
| 5,732,283 | 3/1998 | Rose et al. | 710/16 |

*Primary Examiner*—Robert W. Beausoliel, Jr.
*Assistant Examiner*—Bryce Bonzo
*Attorney, Agent, or Firm*—Suiter & Associates PC; Anthony Claiborne

[57] ABSTRACT

A standalone virtual device driver that is not a mouse driver replacement or a mouse minidriver examines mouse data packets received from the mouse hardware for data packets that are obviously or likely to be faulty. When such a data packet is detected, the virtual device driver also removes the suspected faulty data by returning a null mouse packet to the mouse driver in its place. The virtual device driver may also initiate resynchronization procedures or reset the mouse hardware if necessary.

34 Claims, 5 Drawing Sheets

METHOD FOR IMPROVING MOUSE PERFORMANCE AND VIRTUAL DEVICE DRIVER THEREFOR

FIELD OF THE INVENTION

The present invention relates generally to a virtual device driver designed to run with Microsoft Windows 95® or Windows 98® and, more particularly, to a virtual device driver which monitors mouse data packets and discards erroneous of faulty data.

BACKGROUND OF THE INVENTION

Although the keyboard is the primary computer input device in a computer system, the prevalence of graphical user interfaces (GUIs) virtually require the use pointing device such as a mouse.

A mouse uses a roller ball which rests against two rollers for translating X- and Y-axis movement into electrical signals, e.g., via an optical or opto-mechanical mechanism. A mouse will typically have a hand-sized housing and is operated by moving the mouse around on a flat surface such as a desktop or mouse pad. Similarly, a trackball is essentially the same as the mouse in terms design, functionality, and electrical interface, but is used upside down. Rather than moving the entire device, the device is stationary with the roller ball facing upward wherein the ball may be turned with the hand directly.

Mouse button and position data are typically sent in 11-bit data bytes consisting of eight data bits plus framing and control bits. Mouse information is typically sent as three consecutive bytes. For a typical mouse such as a PS/2 mouse, the first byte of the three byte mouse data packet provides information regarding the left and right button state; the second byte of the three byte mouse data packet provides movement or displacement in the X-direction; and the third byte of the three byte mouse data packet provides movement or displacement in the Y-direction. Typically the first byte of the three byte mouse data packet will further contain data for direction of movement in the X-direction, direction of movement in the Y-direction, as well as X- and Y-overflow data bits.

In the typical mouse protocol, such as the PS/2 mouse protocol, there is no synchronization bit provided, so if a hardware communication error occurs, and one of the three bytes of the three byte mouse data packet is lost, the mouse driver will interpret the next byte received erroneously. For example, if the first data packet with button state information is lost, the second byte with X-displacement information will be erroneously interpreted as the first (button state) byte, and so forth. As a result, all subsequent mouse packets will be erroneously interpreted by the mouse driver until the mouse can be resynchronized with the driver.

It would be desirable to provide software that could improve mouse reliability by identifying and discarding faulty mouse data and resynchronizing the mouse with the mouse driver. In order to avoid replacing the standard mouse driver, which may contain very efficient hardware-dependent code, it would also be desirable to provide this functionality as a standalone virtual device driver rather than a replacement mouse driver or mouse minidriver.

SUMMARY OF THE INVENTION

The present invention is a virtual device driver (VxD) designed to run under Microsoft Windows 95 or Windows 98. A VxD under runs as part of the kernel, thus having access to the memory of the kernel and all running processes as well as raw access to the hardware. The VxD according to the present invention hooks the VMD_Manipulate_Pointer_Message service provided by the Microsoft mouse driver, as documented in the Windows 95 Device Driver Kit (DDK).

The VxD according to the present invention improves mouse reliability by examining the mouse packets received by the mouse driver and taking appropriate action when necessary.

The VxD of the present invention does not use the VMD_Manipulate_Pointer_Message to transform mouse packets, which is the original, documented purpose, but rather, to remove faulty mouse packets when they are detected. Instead of transforming a detected faulty mouse packet, the faulty mouse packet is discarded and a null mouse packet is returned in its place.

The present invention is implemented as a virtual device driver, rather than a replacement mouse driver or mouse minidriver. Implementing the present invention as a VxD, allows the standard Microsoft mouse driver, which may have very efficient hardware-dependent code, to handle the mouse hardware. The mouse guard VxD according to the present invention is implemented as a separate VxD which hooks a documented mouse service, namely, the VMD_Manipulate_Pointer_Message mouse service, but which uses this hook in a novel way. The Windows 95 DDK documentation indicates that the VMD_Manipulate_Pointer_Message service is designed to allow manipulation of the mouse movements, including scaling and rotation operations, rather than the use made of this service by the VxD according to the present invention, i.e., detecting and discarding faulty mouse packets.

The VxD according to the present invention can be written as a generic VxD that hooks the VMD_Manipulate_Pointer_Message function of VMOUSE when it is loaded and unloads the hook when the VxD is unloaded. The VxD monitors motise packets processed by VMOUSE. The VxD detects faulty mouse packets according to one or more prespecified criteria and removes any such mouse packets determined to be faulty.

The VxD according to the present invention installs a hook procedure that is called by the Windows 95 or Windows 98 Virtual Mouse Driver each time a mouse packet is received. Although the present invention will be described herein primarily in reference to mouse devices compatible with the PS/2 (dedicated motherboard mouse port) mouse hardware protocol, including not only a PS/2 mouse attached to a PS/2 mouse port, but also a wireless remote control device that communicates with a device that is plugged into a PS/2 mouse port, it will be understood by those skilled in the art that the present invention can also be implemented for hardware devices that are compatible with other mouse hardware protocols, including, but not limited to serial mice, bus mice, hybrid serial/motherboard mouse port mice, and the like. Although the present invention will be discussed primarily in terms of a mouse, it will be understood the present invention may also be employed with trackball pointing devices which uses the same electrical interface and data format as the mouse.

As used herein, the terms "mouse packet" or "mouse data packet" will be used to refer to a set of three consecutive mouse data bytes providing button state, X-displacement, and Y-displacement information (exclusive of framing and control bits). Table 1 shows typical information for each of the three mouse data bytes that make up a mouse packet. It should be noted protocols may vary from one manufacturer to another and that the particular protocol shown in Table 1 is exemplary only, provided to illustrate the principles of the present invention, and is in no way limiting of the present invention.

TABLE 1

|  | D7 | D6 | D5 | D4 | D3 | D2 | D1 | D0 |
|---|---|---|---|---|---|---|---|---|
| 1st byte YV | XV | YS | XS | 1 | 0 | R | L |  |
| 2nd byte | X7 | X6 | X5 | X4 | X3 | X2 | X1 | X0 |
| 3rd byte Y7 | Y6 | Y5 | Y4 | Y3 | Y2 | Y1 | Y0 |  |

Table 1 illustrates an exemplary three byte mouse data packet where L=left button state (1=pressed down); R=right button state (1=pressed down); X0–X7=movement in the X-direction; Y0–Y7=movement in the Y-direction; XS=direction of the movement in the X-axis (1=up); YS =direction of the movement in the Y-axis (1=left); XV, YV=overflow of the movement data bits (1=overflow has occurred). For purposes of illustrating the present invention, the terms "first byte" and "button state byte" will be used synonymously herein, as will the terms "second byte", "X-displacement byte", and "delta-X byte", and as will the terms "third byte", "Y-displacement byte", and "delta-Y byte". However, it will be recognized by those skilled in the art that other configurations are possible and that the present invention is not limited to any particular configuration or protocol.

It is to be understood that both the foregoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1A:
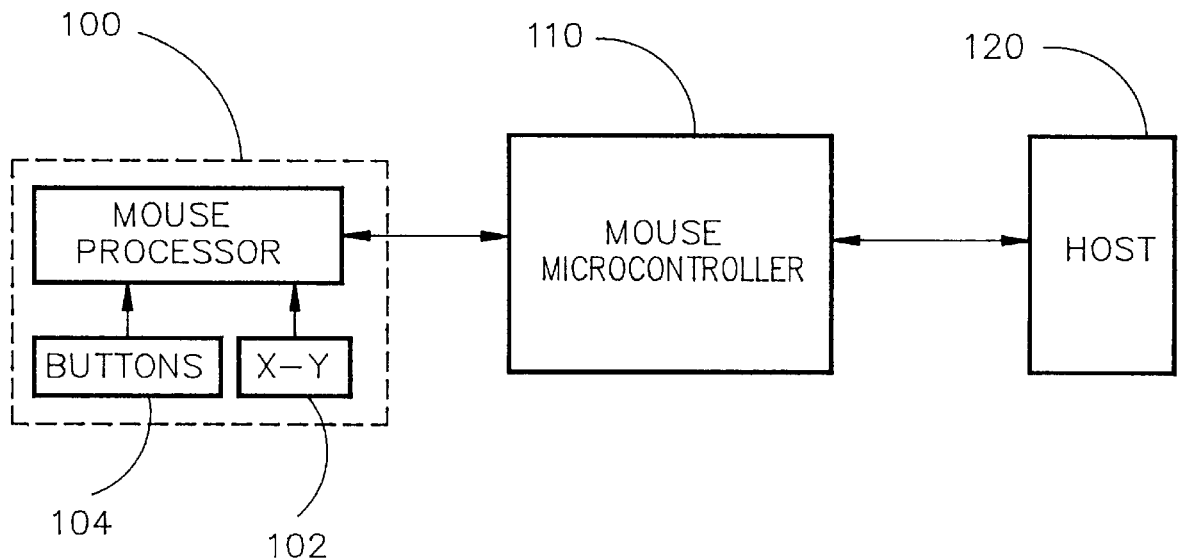
FIGS. 1A and 1B shows a typical hardware configuration for use with the VxD according to the present invention.
Figure 1B:
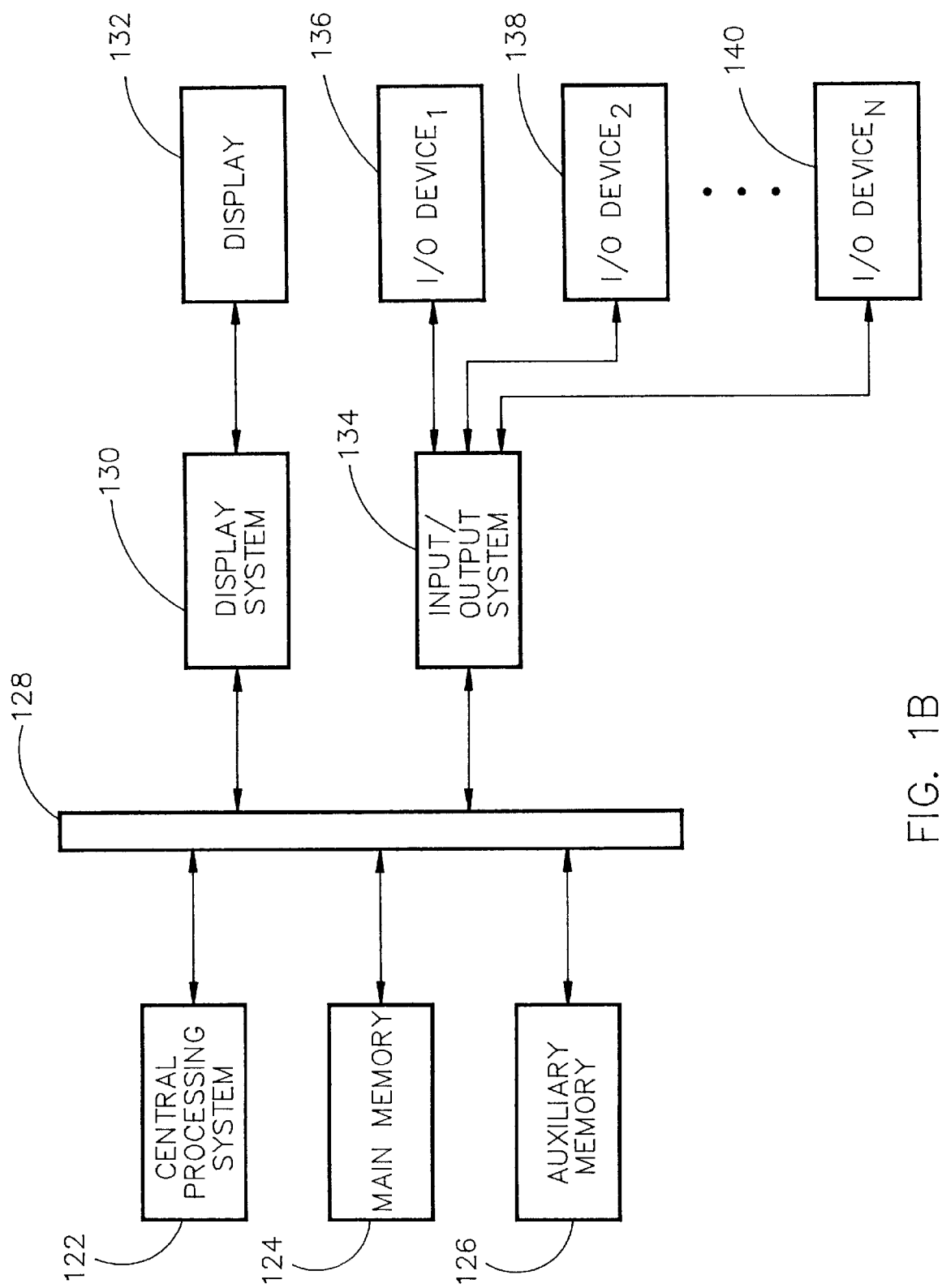

FIG. 1 shows the basic architecture of a preferred mouse hardware configuration for use with the VxD according to the present invention. Mouse 100 comprises a mechanism 102 for converting x and y displacement into an electrical signal. Mechanism 102 may be, for example, an opto-mechanical system which employs a light chopper that rotates in response to roller ball movement and that is disposed between a light source and a light detector. Also known are optical systems which require the mouse to be used on a special pad having a grid of different reflectances.

Mouse 100 also comprises one or more buttons 104. Two button mouses are most common although three button mouses are also known.

In the preferred embodiment depicted in FIG. 1, mouse 100 is interfaced with a mouse microcontroller 110 located on the motherboard of list 120. Mouse microcontroller 110 is typically the second channel of an Intel 8042-type keyboard controller. This configuration, wherein there is a dedicated mouse port connected to the motherboard, is often referred to as a PS/2 port or PS/2 mouse interface. It will be recognized that the present invention will also be applicable to mice connected to a serial port or a bus-card interface.

Figure 2:
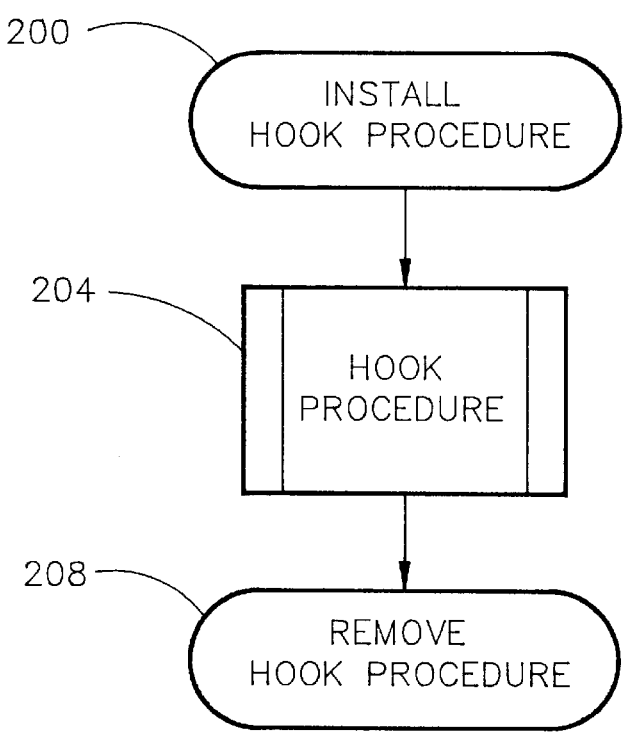
FIG. 2 depicts a flow chart outlining the basic operation of the present invention.

FIG. 2 illustrates the basic operation of the present invention. The mouse guard VxD according to the present invention has three main functions: installation, removal, and the hook procedure. The installation function 200 calls the Virtual Machine Manager's function, Hook_Device_Service, for the VMD_Manipulate_Pointer_Message so that the hook procedure 204 according to the present invention is called every time a mouse packet is received. The installation function 200 is called when the VxD) according to the present invention is dynamically installed.

The removal function 208 calls the Virtual Machine Manager's function, Unhook_Device_Service, on the hook procedure 204 according to the present invention so that when the VxD according to the present invention is unloaded, the mouse driver will not attempt to call the hook procedure 204 any longer. The removal function 208 is called whenever the VxD according to the present invention is informed that it is about to be dynamically unloaded. In a preferred embodiment, the PLUGPLAY VxD sample driver provided in the Windows 95 DDK may be adapted to implement the dynamic initialization and removal code properly. Once the installation, removal, and the hook procedure functions are set up, the VxD according to the present invention may be compiled and/or assembled using the standard Windows 95 DDK techniques. The PLUGPLAY driver's sample INF file may be adapted to aid in the installation of the VxD according to the present invention. The VxD according to the present invention is installed under Windows 95 as an "Unknown" device, not as a mouse minidriver, using the standard Windows 95 "Add hardware" procedure.

Figure 3:
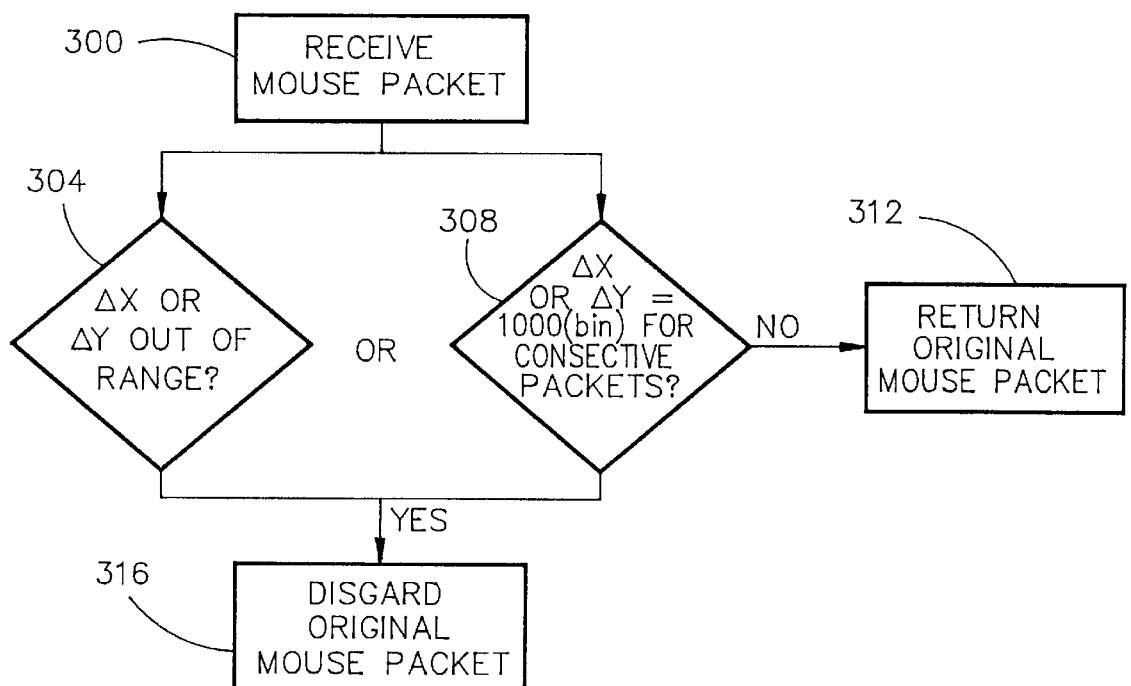
FIGS. 3 and 4 are flow charts describing the hook procedure of the present invention.

Exemplary embodiments of the hook procedure 204 (FIG. 2) are shown in FIGS. 3–6. The hook procedure function 204 (FIG. 2) is called every time that the mouse driver assembles a mouse packet from the mouse hardware. Referring now to FIG. 3, in step 300, the hook procedure receives the mouse packet and is provided with three pieces of information: the current state of the mouse buttons, the relative horizontal displacement since the last mouse packet, and the relative vertical displacement since the last mouse packet. The hook procedure can manipulate these three values to change the behavior of the mouse, or can leave the three values alone.

The hook procedure of the VxD according to the present invention has three major responsibilities: to detect faulty mouse behavior, discard faulty mouse packets, and resynchronize the mouse hardware to the mouse driver or, if necessary, reset the mouse hardware.

Mouse data that may be presumed to be faulty is detected by monitoring the mouse data for predefined or prespecified values or data patterns indicating that the mouse data is obviously faulty or, at least, likely to be faulty. As used herein, mouse data stated to be faulty will generally refer to mouse data presumed to be faulty according to the predefined criteria of the VxD according to the present invention. The VxD according to the present invention does not attempt to determine whether an error has, in fact, Occurred.

One criteria for detecting faulty mouse behavior is to test, in step 304, the relative horizontal displacement (hereinafter referred to as "delta-X") and relative vertical displacement (hereinafter referred to as "delta-Y") of the current mouse packet received in step 300 to determine if it is outside of a predetermined range, such as a displacement that would not be possible within one mouse report period.

Although 32-bits of resolution for the delta-X and delta-Y are provided to the hook procedure, the particular mouse hardware is usually capable of far fewer bits of resolution. In the case of the PS/2 mouse, the largest mouse displacement placement appears to be 7-bits, which would be a displacement of 0x7F (hexadecimal). Therefore, in the case of a PS/2 mouse, when the hook procedure detects a delta-X or delta-Y displacement of 0x80 or larger in step 304, it is safe to assume that the current mouse packet is faulty.

A second method detecting faulty mouse data packets is to check the data for unusual patterns that can indicate faulty behavior. In the case of the PS/2 mouse, faulty behavior is strongly correlated with consecutive delta-X or delta-Y values that have the following property: a particular subset of the bits of the delta-X or delta-Y value remain the same across several consecutive mouse packets. As an example, it has been observed that if the lower 4-bits of the delta-X or delta-Y value is reported as 1000 (binary) for several consecutive mouse packets, it is likely that the mouse packets being received from the mouse are faulty. This is likely caused by the mouse hardware getting out of sync with the mouse driver. As described above, a PS/2 mouse protocol mouse packet consists of three bytes: a button state byte, a delta-X byte, and a delta-Y byte. There is no synchronization bit in this protocol, so if a hardware or communication error occurs, and one of the three bytes of a mouse packet is lost, the mouse driver will interpret the next byte erroneously, i.e., if the first byte of the three byte data packet is lost, the second byte, containing delta-X information will be erroneously interpreted as the button state byte, the third byte containing delta-Y information will be erroneously interpreted as the delta-X byte, and the first byte of the next transmitted mouse packet, containing button state information will erroneously be interpreted as the delta-Y byte of the previous packet.

In step 308, the mouse data packets received in step 300 are examined for an unusual pattern persistent over two or more consecutive mouse packets. If the delta-X and delta-Y are within the predefined limits and no unusual patterns, such as a value of 1000 (bin) in the lower four bits of the delta-X or delta-Y bytes in the case of a PS/2 mouse, the hook procedure according to the present invention returns original mouse packet in step 312. If the mouse packet received in step 300 is not identified as a faulty mouse packet in steps 304 or 308, then the original mouse packet is presumed to be correct and the original packet data values are returned. If the mouse packet received in step 300 is identified as faulty in either step 304 or 308, the mouse packet is discarded in step 316. The process of FIG. 3 is performed for each mouse packet received from the mouse.

Figure 4:
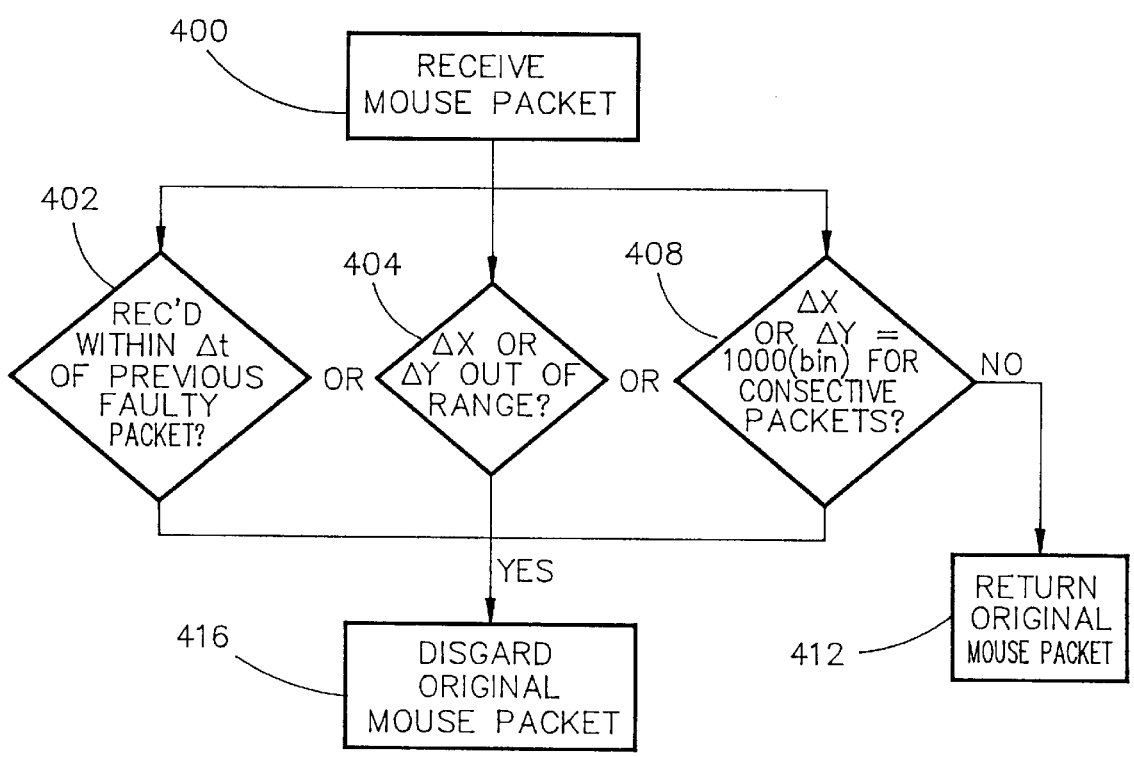

An additional criterion for detecting faulty mouse data packets is based on the observation that faulty mouse packets are often received in groups. Thus, in addition to the two criteria for identifying mouse data packets that are obviously faulty or suspected as likely being faulty as described above, namely examining the mouse packets for out of range delta-X or delta-Y displacements and for unusual patterns in consecutive packets, a third criteria for discarding mouse packets is based on whether a given mouse packet is received within some short predetermined period of time from the time of receipt of a mouse packet identified to be or suspected to be faulty under the first two criteria. Individual faulty packets, some with false button presses, do not always have an obvious out-of-range indication. A faulty mouse packet is, therefore, used as a red flag that subsequent mouse packets are not to be trusted and should be discarded for a short period of time until the problem is resolved by itself or until resynchronization procedures are successful. This process is outlined in FIG. 4. In step 400, the original mouse packet is received. If the current mouse packet is determined, in step 402, to have been received within a predetermined period of time from the receipt of a previous packet identified as faulty, the mouse packet will be disregarded (step 416), whether or not the packet is obviously faulty or possibly good. Likewise, if the mouse packet is identified as being obviously or likely to be faulty, i.e., as being out of range (step 404) or is one of several consecutive packets having an unusual pattern (step 408), the mouse packet will be discarded (step 416). It the packet is not identified as faulty under the criteria of steps 404 and 408, and is not received within a predetermined period of time after a previously faulty mouse packet (step 402), then the hook procedure according to the present invention returns the original mouse packet in step 412. The process of FIG. 4 is performed for each mouse packet received from the mouse.

By the term "discarded", it is meant that all data in the mouse packet is disregarded and a null packet is substituted therefore. By returning a null packet, inaccurate, false button presses which are often present in illegal packets will not be processed by the mouse driver and thus, will not be seen by the user. In a null packet, the button state reflects that no buttons have been pressed, the delta-X value is zero, and the delta-Y value is zero.

Figure 5:
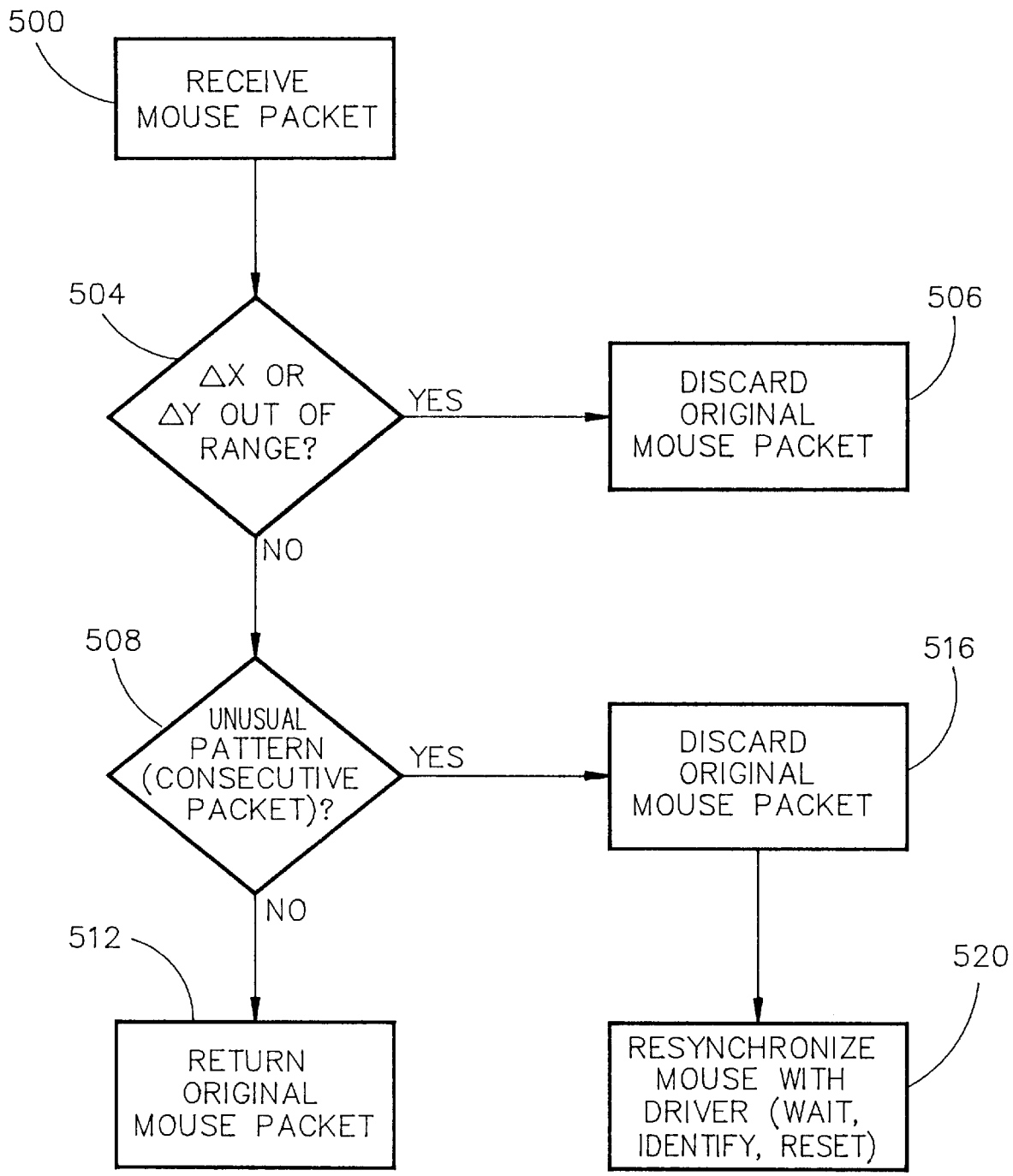
FIGS. 5 and 6 are flow charts outlining a preferred embodiment according to the present invention wherein the mouse is resynchronized with the mouse driver upon the detection of faulty mouse data.

FIG. 5 shows outlines an embodiment according to the present invention incorporating a resynchronization step. In step 500, a mouse packet is received. If the delta-X or delta-Y value is out of range in step 504, the mouse packet is discarded in step 506. If the delta-X and delta-Y values are within the range, it is determined whether the packet is one of several consecutive packets having a prespecified unusual data bit pattern in a prespecified subset of data bits in step 508. If the packet is deemed not to be one of several consecutive packets having a prespecified unusual pattern, the original mouse packet is returned in step 512. If an unusual pattern is found in the mouse packet in step 508, the original mouse packet is discarded in step 516 and the mouse is resynchronized with the mouse driver in step 520. The process of FIG. 5 is repeated for each mouse packet received.

Figure 6:
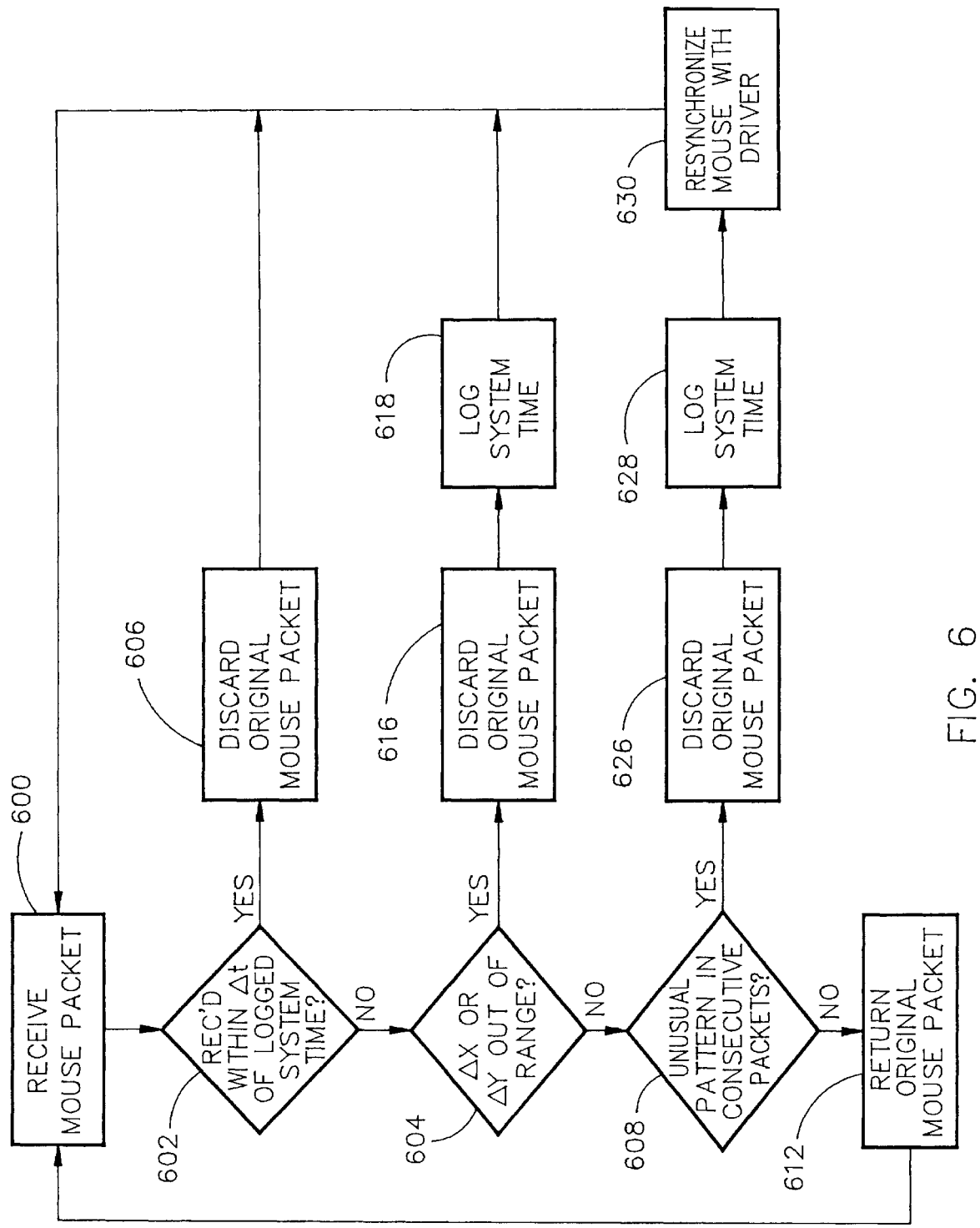

FIG. 6 shows an embodiment according to the present invention similar to that shown in FIG. 5, with the additional steps of logging the system time upon the receipt of an obviously or likely faulty mouse packet and discarding subsequent mouse packets for a prespecified time period, even if such mouse packets are possibly good (i.e., would not be presumed faulty by the present VxD). The mouse packet is received in step 600. in step 602, it is determined whether the mouse packet has been received within a prespecified time period of a previously logged system time, i.e., logged in response to a previously received mouse packet presumed to be faulty under steps 604 or 608. If the mouse packet has been received within such a specified time period, the mouse packet is discarded in step 606 and the process returns lo step 600. If the mouse packet has not been received within such a specified time period, it is determined whether the delta-X or delta-Y value is out of range in step 604. If the delta-X or delta-Y value is out of range, the mouse packet is discarded in step 616 and the system time as reported by the operating system is logged in step 618 and the process returns to step 600. If the delta-X and delta-Y values are within range, it is determined whether the packet is one of several consecutive packets having a prespecified unusual data bit pattern in a prespecified subset of data bits in step 608. If the packet is deemed not to be one of several consecutive packets having a prespecified unusual pattern, the original mouse packet is returned in step 612. If an unusual pattern is found in the mouse packet in step 608, the original mouse packet is discarded in step 626 and the system time is logged in step 628. The mouse is then resynchronized with the mouse driver in step 630 and the process returns to step 600.

The mouse can be resynchronized with the mouse driver in a number of ways, including waiting to see if the problem resolves itself, polling the mouse hardware, and resetting mouse hardware.

The hook procedure can also resynchronize the mouse hardware with the mouse driver by polling the mouse hardware, which causes the mouse hardware to send data packets identifying itself. Resynchronization may be effected in this manner when the mouse identification data packets consist of a different number of bytes than the mouse data packets generated during mouse operation. In the case of the PS/2 mouse, when the lower four bits of several consecutive delta-X or delta-Y packets appear to be stuck at 1000 (binary), it may be presumed that there is a synchronization error. When the PS/2 mouse identifies itself, only two bytes are generated. The VxD according to the present invention does not read these two bytes, but rather allows the mouse driver to read these bytes, which it will initerpret as two bytes of a three byte mouse packet. This process may be performed as necessary until the mouse hardware is in sync with the driver. In a preferred embodiment, the mouse is polled twice, in which case four bytes will be generated. In this manner, the mouse driver expecting data in three byte packets will receive an "extra" byte which will effect a resynchronization when the mouse hardware and driver have become out of sync due to the loss of a single byte of a three-byte packet, i.e., polling twice generates tour bytes which will compensate for a single lost byte.

The hook procedure may also effect a resynchronization by resetting the mouse hardware. In a system with a PS/2 port using the standard resources, the VxD according to the present invention can reset the mouse by sending 0xD4 to I/O port 0x64 and then sending 0xFF to I/O port 0x60. Resetting the mouse hardware is preferably reserved for extraordinary circumstances, for example, when the above procedures (waiting and polling) have been unsuccessful. In the case of the PS/2 mouse protocol, the hook procedure according to the present invention sends a reset command to the mouse, and then sets up a global timeout event to be scheduled in the future, e.g., after a few hundred milliseconds. It is assumed that the mouse driver, and not the VxD according to the present invention will read the bytes from the mouse hardware that are generated when the reset is complete before the global timeout event is called. In the global timeout event code provided in the VxD according to the present invention, the PS/2 mouse's resolution and sampling rate are restored to the normal (but non-default) values, and then the PS/2 mouse is reenabled.

The following algorithm illustrates an embodiment of the present invention wherein the VxD according to the present invention, upon detection of an obviously or likely false packet, will reset the mouse hardware, record the current system time so that it can ignore any packets that are received within a predetermined number of milliseconds of the false mouse packet, and replace the false packet with a null packet:

```
if(|Δx|>LIMIT OR |Δy|>LIMIT)
{
    Reset the mouse hardware
    Set Start_Ignore_Timer_Valid = TRUE
    Set Start_Ignore_Timer = Current System Time reported by
    Operating System
    Return a NULL mouse packet
}
else
{
    if (Start_Ignore_Timer_Valid == TRUE)
    {
        if (Current System Time reported by Operating System -
        Start_Ignore_Timer<Δt)
            Return a NULL mouse packet
        else
        {
            Start_Ignore_Timer_Valid = FALSE
            Return the ORIGINAL mouse packet
        }
    }
    else
        return the ORIGINAL mouse packet
}
```

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A method for improving mouse performance comprising the steps of:
    defining one or more criteria for determining if mouse data packets communicated from a mouse to a mouse device driver may be presumed to be faulty, each mouse data packet comprising mouse button state information, an X-displacement value, and a Y-displacement value;
    receiving mouse data packets output by the mouse;
    examining each received mouse data packet for conformance with said one or more criteria; and
    replacing each mouse data packet that conforms with at least one of said one or more criteria with a null packet.

2. The method of claim 1 wherein one of said one or more criteria is whether either the X-displacement value or the Y-displacement value is outside of a predetermined range of presumably valid values.

3. The method of claim 2 wherein said predetermined range of X- and Y-displacement values comprises the range of X- and Y-displacements possible within one mouse report period.

4. The method of claim 1 wherein one of said one or more criteria is whether a portion of one or more of said data packets contains a prespecified pattern that is correlated with faulty mouse behavior.

5. The method of claim 4 wherein said prespecified pattern is correlated with a synchronization error.

6. The method of claim 5 wherein said criteria for presuming a mouse packet to be faulty requires said prespecified pattern to be reported over a plurality of consecutive mouse packets.

7. The method of claim 6 wherein said mouse is a PS/2 compatible mouse.

8. The method of claim 7 wherein said unusual pattern is a binary value of 1000 in the lower four bits of either the X-displacement value or the Y-displacement value reported over three or more consecutive mouse packets.

9. A method for improving mouse performance comprising the steps of:
 (a) defining one or more criteria for determining if mouse data packets communicated from a mouse to a mouse device driver may be presumed to be faulty, each mouse data packet comprising mouse button state information, an X-displacement value, and a Y-displacement value;
 (b) receiving mouse data packets output by the mouse;
 (c) examining each received mouse data packet for conformance with said one or more criteria, wherein said mouse data packets that conform with said criteria are presumed faulty;
 (d) logging the time at which a presumed faulty mouse data packet is received;
 (e) replacing each mouse data packet that is presumed faulty with a null packet; and
 (f) replacing each mouse data packet received with a null packet for a prespecified period of time after the time is logged in step (d).

10. The method of claim 9 wherein one of said one or more criteria is whether either the X-displacement value or the Y-displacement value is outside of a predetermined range of presumably valid values.

11. The method of claim 10 wherein said predetermined range of X- and Y-displacement values comprises the range of X- and Y-displacements possible within one mouse report period.

12. The method of claim 9 wherein one of said one or more criteria is whether a portion of one or more of said data packets contains a prespecified pattern that is correlated with faulty mouse behavior.

13. The method of claim 12 wherein said prespecified pattern is correlated with a synchronization error between said mouse and said mouse device driver.

14. The method of claim 13 wherein said criteria for presuming a mouse packet to be faulty requires said prespecified pattern to be reported over a plurality of consecutive mouse packets.

15. The method of claim 14 further comprising the step of resynchronizing the mouse with the mouse device driver.

16. The method of claim 14 wherein said mouse is a PS/2 compatible mouse.

17. The method of claim 15 wherein said unusual pattern is a binary value of 1000 in the lower four bits of either the X-displacement value or the Y-displacement value reported over three or more consecutive mouse packets.

18. The method of claim 17 further comprising the step of resynchronizing the mouse with the mouse device driver.

19. The method of claim 18 wherein the mouse is resynchronized with the mouse device driver by polling the mouse.

20. The method of claim 19 wherein the mouse is resynchronized with the mouse device driver by polling the mouse twice.

21. The method of claim 18 wherein the mouse is resynchronized with the mouse device driver by resetting the mouse.

22. The method of claim 13 further comprising the step of resynchronizing the mouse with the mouse device driver.

23. The method of claim 22 wherein the mouse is resynchronized with the mouse device driver by polling the mouse.

24. The method of claim 23 wherein the mouse is resynchronized with the mouse device driver by polling the mouse twice.

25. The method of claim 22 wherein the mouse is resynchronized with the mouse device driver by resetting the mouse.

26. A method for improving mouse performance comprising the steps of: detecting a false mouse data packet; resetting the mouse hardware; recording the current system time; ignoring any subsequent packets that are received within a predetermined number of milliseconds of the false mouse data packet; and replacing the false packet with a null packet.

27. In a computer system, a virtual device driver, said virtual device driver comprising:
 means for defining one or more criteria for determining if mouse data packets communicated from a mouse to a mouse device driver may be presumed to be faulty, wherein each mouse data packet comprises mouse button state information, an X-displacement value, and a Y-displacement value;
 means for receiving mouse data packets output by the mouse;
 means for examining each received mouse data packet for conformance with said one or more criteria; and
 means for replacing each mouse data packet that conforms with at least one of said one or more criteria with a null packet.

28. The virtual device driver according to claim 27, comprising:
 (a) means for defining one or more criteria for determining if mouse data packets communicated from a mouse to a mouse device driver may be presumed to be faulty, each mouse data packet comprising mouse button state information, an X-displacement value, and a Y-displacement value;
 (b) means for receiving mouse data packets output by the mouse;
 (c) means for examining each received mouse data packet for conformance with said one or more criteria, wherein said mouse data packets that conform with said criteria are presumed faulty;
 (d) means for logging the time at which a presumed faulty mouse data packet is received;
 (e) means for replacing each mouse data packet that is presumed faulty with a null packet; and
 (f) means for replacing each mouse data packet received with a null packet for a prespecified period of time after the time is logged in step (d).

29. An article of manufacture comprising a computer useable medium having a computer readable code means embodied in said medium for improving mouse performance, the computer readable program code in said article of manufacture comprising:
 computer readable program code means to define one or more criteria for determining if mouse data packets communicated from a mouse to a mouse device driver may be presumed to be faulty, wherein each mouse data packet comprises mouse button state information, an X-displacement value, and a Y-displacement value;

computer readable program code means to receive mouse data packets output by the mouse;

computer readable program code means to examine each received mouse data packet for conformance with said one or more criteria; and computer readable program code means to replace each mouse data packet that conforms with at least one of said one or more criteria with a null packet.

30. The article of manufacture according to claim 29, comprising:

(a) computer readable program code means to define one or more criteria for determining if mouse data packets communicated from a mouse to a mouse device driver may be presumed to be faulty, each mouse data packet comprising mouse button state information, an X-displacement value, and a Y-displacement value;

(b) computer readable program code means to receive mouse data packets output by the mouse;

(c) computer readable program code means to examine each received mouse data packet for conformance with said one or more criteria, wherein said mouse data packets that conform with said criteria are presumed faulty;

(d) computer readable program code means to log the time at which a presumed faulty mouse data packet is received;

(e) computer readable program code means to replace each mouse data packet that is presumed faulty with a null packet; and (f) computer readable program code means to replace each mouse data packet received with a null packet for a prespecified period of time after the time is logged in step (d).

31. A program storage device readable by a machine, tangibly embodying a program of instructions executable by the machine to perform method steps for improving mouse performance by detecting and removing faulty mouse data, said method steps comprising:

defining one or more criteria for determining if mouse data packets communicated from a mouse to a mouse device driver may be presumed to be faulty, wherein each mouse data packet comprises mouse button state information, an X-displacement value, and a Y-displacement value;

receiving mouse data packets output by the mouse;

examining each received mouse data packet for conformance with said one or in more criteria; and replacing each mouse data packet that conforms with at least one of said one or more criteria with a null packet.

32. The program storage device readable by a machine according to claim 31, tangibly embodying a program of instructions executable by the machine to perform method steps for improving mouse performance by detecting and removing faulty mouse data, said method steps comprising:

(a) defining one or more criteria for determining if mouse data packets communicated from a mouse to a mouse device driver may be presumed to be faulty, each mouse data packet comprising mouse button state information, an X-displacement value, and a Y-displacement value;

(b) receiving mouse data packets output by the mouse;

(c) examining each received mouse data packet for conformance with said one or more criteria, wherein said mouse data packets that conform with said criteria are presumed faulty;

(d) logging the time at which a presumed faulty mouse data packet is received;

(e) replacing each mouse data packet that is presumed faulty with a null packet; and (f) replacing each mouse data packet received with a null packet for a prespecified period of time after the time is logged in step (d).

33. In a computer system, a pointer control system, said pointer control system being of the type capable of providing button state, X-direction displacement, and Y-direction displacement information to said computer system, said pointing device comprising:

means for providing an electrical signal corresponding to button state, X-direction displacement, and Y-direction displacement;

control circuitry connected to said means for providing an electrical signal;

an interface for communicatively coupling said control circuitry to a said computer system for sending X-Y position information to said computer system; and means for defining one or more criteria for determining if mouse data packets communicated from a mouse to a mouse device driver may be presumed to be faulty, wherein each mouse data packet comprises mouse button state information, an X-displacement value, and a Y-displacement value;

means for receiving mouse data packets output by the mouse;

means for examining each received mouse data packet for conformance with said one or more criteria; and means for replacing each mouse data packet that conforms with at least one of said one or more criteria with a null packet.

34. The pointer control system according to claim 33, comprising:

(a) means for defining one or more criteria for determining if mouse data packets communicated from a mouse to a mouse device driver may be presumed to be faulty, each mouse data packet comprising mouse button state information, an X-displacement value, and a Y-displacement value;

(b) means for receiving mouse data packets output by the mouse;

(c) means for examining each received mouse data packet for conformance with said one or more criteria, wherein said mouse data packets that conform with said criteria are presumed faulty;

(d) means for logging the time at which a presumed faulty mouse data packet is received;

(e) means for replacing each mouse data packet that is presumed faulty with a null packet; and (f) means for replacing each mouse data packet received with a null packet for a prespecified period of time after the time is logged in step (d).

* * * * *